(12) United States Patent
Jones et al.

(10) Patent No.: US 9,073,624 B2
(45) Date of Patent: Jul. 7, 2015

(54) METHODS AND APPARATUS TO COOPERATIVELY LIFT A PAYLOAD

(71) Applicant: The Boeing Company, Chicago, IL (US)

(72) Inventors: Richard Donovan Jones, East Wenatchee, WA (US); Michael Duffy, Prospect Park, PA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/101,138

(22) Filed: Dec. 9, 2013

(65) Prior Publication Data

US 2015/0158576 A1 Jun. 11, 2015

(51) Int. Cl.
*B64C 19/02* (2006.01)

(52) U.S. Cl.
CPC ........................................ *B64C 19/02* (2013.01)

(58) Field of Classification Search
CPC ............ B64C 2201/00; B64C 2201/02; B64C 2201/024; B64C 2201/14; B64C 2201/141; B64C 2201/143; B64C 37/02; B64C 39/024; B64C 19/02
USPC ............................................. 244/17.11, 17.13
See application file for complete search history.

(56) References Cited

U.S. PATENT DOCUMENTS

| | | | |
|---|---|---|---|
| 6,591,169 B2 | 7/2003 | Jones et al. | |
| 6,814,330 B2 | 11/2004 | Jones et al. | |
| 8,370,003 B2 * | 2/2013 | So et al. | 701/3 |
| 2004/0245378 A1 * | 12/2004 | Nonami et al. | 244/17.13 |
| 2005/0027406 A1 * | 2/2005 | Nonami et al. | 701/3 |
| 2007/0288132 A1 | 12/2007 | Lam | |
| 2009/0099768 A1 | 4/2009 | Bauer et al. | |
| 2010/0161155 A1 * | 6/2010 | Simeray | 701/3 |
| 2011/0301784 A1 * | 12/2011 | Oakley et al. | 701/2 |
| 2013/0268185 A1 * | 10/2013 | Rabbath et al. | 701/300 |
| 2014/0374532 A1 * | 12/2014 | Duffy et al. | 244/2 |

OTHER PUBLICATIONS

Rabbath, C.A.; "A Finite-State Machine for Collaborative Airlift with a Formation of Unmanned Air Vehicles"; Sep. 6, 2012; Journal of Intelligent & Robotic Systems; vol. 70, Issue 1-4; pp. 233-253.*

Smith et al., "Control of Heavy Lift Helicopter Teams", SCPNT, <http://arl.stanford.edu/> 2008 (1 page).

Michael et al., "Cooperative Manipulation and Transportation with Aerial Robots" Auton Robot, Sep. 11, 2010 (pp. 73-86).

(Continued)

*Primary Examiner* — Jerrah Edwards
*Assistant Examiner* — Tamara Weber
(74) *Attorney, Agent, or Firm* — Hanley, Flight & Zimmerman, LLC

(57) ABSTRACT

Methods and apparatus to cooperatively lift a payload are disclosed. An example method to control a lift vehicle includes determining a first positional state of the lift vehicle with respect to a payload controlled by a plurality of lift vehicles including the lift vehicle, determining a second positional state of the lift vehicle with respect to a goal location, detecting distances to the other ones of the plurality of lift vehicles, determining a third positional state of the lift vehicle based on the distances to the other ones of the plurality of lift vehicles, and calculating a control command to control the lift vehicle based on the first positional state, the second positional state, and the third positional state.

20 Claims, 8 Drawing Sheets

(56) References Cited

OTHER PUBLICATIONS

K. Kondak et al., "Cooperative Autonomous Helicopters for Load Transportation and Environment Perception", Jun. 9, 2009 (pp. 299-310).
Anibal Ollero, "Platform for Autonomous self-deploying and operation of Wireless sensor-actuator networks cooperating with AeRial objEcts", <http://aware-project.net> Aug. 2006 (2 pages).
A. Ollero et al., "Integration of aerial robots and wireless sensor and actuator networks. The AWARE project", 2010 IEEE International Conference on Robotics and Automation, May 2010 (pp. 1104 & 1105).
Mellinger, Daniel, "Trajectory Generation and Control for Quadrotors", A Dissertation in Mechanical Engineering and Applied Mechanics, 2012 (135 pages).
Kushleyev et al., "Towards a Swarm of Agile Micro Quadrotors", Robotics: Science and Systems, Jul. 2012 (8 pages).
Jiang et al., "Analysis and Synthesis of Multi-Rotor Aerial Vehicles", International Design Engineering Technical Conference, Aug. 2011 (10 pages).
Lindsey et al., "Construction of Cubic Structures with Quadrotor Teams", Robotics: Science and Systems, Jun. 2011 (8 pages).
Mellinger et al., "Control and Planning for Vehicles with Uncertainty in Dynamics", Int. Conf. on Robotics and Automation, Anchorage, AK, May 2010 (pp. 960-965).
Mellinger et al., "Control of Quadrotors for Robust Perching and Landing", Int. Powered Lift Conference, Philadelphia, PA, Oct. 2010 (8 pages).
Mellinger et al., "Cooperative Grasping and Transport using Multiple Quadrotors", Distributed Autonomous Robotic Systems, Lausanne, Switzerland, Nov. 2010 (12 pages).
Mellinger et al., "Design, Modeling, Estimation and Control for Aerial Grasping and Manipulation", Int. Conf. on Intelligent Robots and Systems, Sep. 2011 (pp. 2668-2673).
Powers et al., "Influence of Aerodynamics and Proximity Effects in Quadrotor Flight", Int. Symposium on Experimental Robotics, Jun. 2012 (14 pages).
Mellinger et al., "Minimum Snap Trajectory Generation and Control for Quadrotors", Int. Conf. on Robotics and Automation, Shanghai, China, May 2011 (6 pages).
Mellinger et al., "Mixed-Integer Quadratic Program Trajectory Generation for Heterogeneous Quadrotor Teams", Int. Conf. on Robotics and Automation, May 2012 (7 pages).
Mellinger et al., "Trajectory Generation and Control for Precise Aggressive Maneuvers with Quadrotors", Int. Symposium on Experimental Robotics, Dec. 2010 (13 pages).
European Patent Office, "Extended European Search Report," issued in connection with Application No. 14185249.1, May 8, 2015, 8 pages.
Maza et al., "Multi-UAV Cooperation and Control for Load Transportation and Deployment," Aug. 13, 2009, Springer Science + Business Media B.V. 2009, 33 pages.

* cited by examiner

METHODS AND APPARATUS TO COOPERATIVELY LIFT A PAYLOAD

FIELD OF THE DISCLOSURE

This disclosure relates generally to autonomous flight and, more particularly, to methods and apparatus to cooperatively lift a payload.

BACKGROUND

Lift vehicles, such as helicopters, are used to move payloads through the air more rapidly than using ground transportation and/or to locations that are unreachable via ground transportation. In situations in which the payload weighs more than a single lift vehicle can carry, multiple lift vehicles may be used to cooperatively carry the payload. However, such maneuvers are dangerous due to the risk of collision between lift vehicles operating in relatively close proximity.

Unmanned lift vehicles, which are controlled by an external control system that coordinates the movements of the lift vehicles, have been developed to perform cooperative lifting. Known unmanned lift vehicles rely on centralized control utilizing information from each vehicle and generation of coordinated commands for each vehicle. Thus, known unmanned lift vehicles are highly sensitive to losses in communication capability and, as a result, have limited ranges and applications. Furthermore, such unmanned lift vehicles are highly sensitive to the loss of one or more of the cooperating lift vehicles, even if there is sufficient payload carrying capability in the remaining cooperating lift vehicles, due to the inability to rapidly adjust the control scheme to account for the change in the loads on the individual vehicles. It is therefore advantageous to provide a control system for cooperative lift vehicles that is robust against and/or independent of a lack of external communication. It is also advantageous to provide a control system for cooperative lift vehicles that is robust against losses of lift vehicles during a cooperative lift.

SUMMARY

Example methods disclosed herein include determining, using a processor of a lift vehicle, a first positional state of the lift vehicle with respect to a payload controlled by a plurality of lift vehicles including the lift vehicle; determining, using the processor, a second positional state of the lift vehicle with respect to a goal location; detecting, using a sensor of the lift vehicle, distances to the other ones of the plurality of lift vehicles; determining, using the processor, a third positional state of the lift vehicle based on the distances to the other ones of the plurality of lift vehicles; and calculating a control command to control the lift vehicle based on the first positional state, the second positional state, and the third positional state.

Example lift vehicles disclosed herein include an elevation control to control an elevation of the lift vehicle; a directional control to control a direction of movement of the lift vehicle; a vehicle state calculator to: determine a first positional state of the lift vehicle with respect to a payload controlled by a plurality of lift vehicles including the lift vehicle; determine a second positional state of the lift vehicle with respect to a goal location; and determine a third positional state of the lift vehicle based on distances to the other ones of the plurality of lift vehicles; and a control system to calculate a control command to control at least one of the elevation control or the directional control based on the first positional state, the second positional state, and the third positional state.

The features, functions, and advantages that have been discussed can be achieved independently in various examples or may be combined in yet other examples further details of which can be seen with reference to the following description and drawings.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Example methods and apparatus disclosed herein provide independent control to lift each vehicle assuming that it is the only vehicle controlling the payload. The combined efforts of multiple vehicles control the payload. While known methods of performing coordinated lifts of a payload with multiple automated vehicles requires information to be passed between vehicles, limitations in the bandwidth, availability and reliability of inter-vehicle communications result in problems for control. Example methods and apparatus disclosed herein can operate using minimal or no inter-vehicle communications.

In some examples disclosed herein, each lift vehicle in a competitively cooperative lifting configuration attempts to control the payload with no communication with the other vehicles. Because each lift vehicle attempts to control the payload while simultaneously contributing to a cooperative lifting of the payload, a configuration of such vehicles is referred to herein as competitively cooperative (or cooperatively competitive). To accomplish competitive cooperation, each cooperating lift vehicle includes a cost function and proximity sensors to enable the lift vehicles to avoid each other. Accordingly, each vehicle is competing with the other lift vehicles to move the payload but also has a cost function for avoiding collisions. In operation, cooperative lifting using example methods and apparatus disclosed herein results in an equilibrium for each vehicle that contributes to controlling the payload, and does not require special case handling for a loss of a lift vehicle. Example methods and apparatus disclosed herein are also generic or insensitive to the number of vehicles used to perform a lift.

In some examples disclosed herein, each lift vehicle in a competitively cooperative lifting configuration includes a command change function to cause the lift vehicle to attempt to control the direction of travel of the payload. The command change function is balanced by a separation cost function that applies a penalty (e.g., a higher cost) to commands (e.g., movements) that would cause the lift vehicle to approach external objects such as other lift vehicles. Example methods and apparatus disclosed herein combine the command change function and the separation cost function to direct the lift vehicle.

Figure 1:
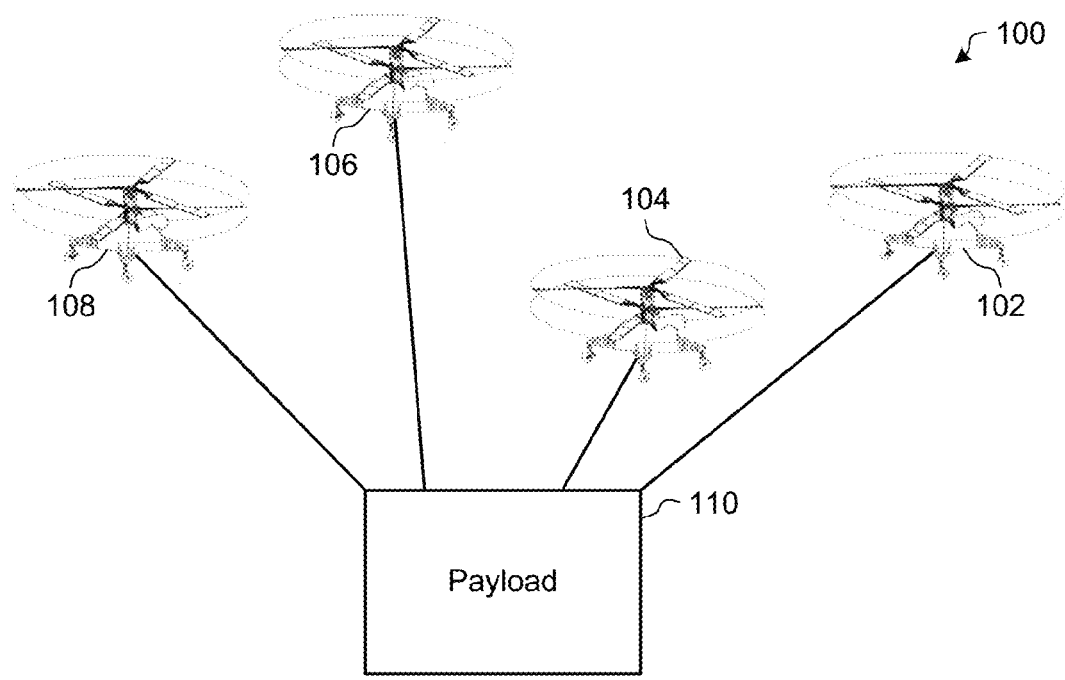
FIG. 1 is a block diagram of an example coordinated lift arrangement including multiple lift vehicles.

FIG. 1 is a block diagram of an example coordinated lift arrangement 100 including multiple lift vehicles 102, 104, 106, 108. The example lift vehicles 102-108 of FIG. 1 cooperate to lift and/or maneuver a payload 110 to a goal location. The lift vehicles 102-108 of FIG. 1 are vertical takeoff or landing (VTOL) vehicles, such as helicopters or tiltrotor vehicles. However, the lift vehicles 102-108 may be any type of vehicle and/or combination of types of vehicles that are capable of lifting an external payload.

Each of the example lift vehicles 102-108 of FIG. 1 is independently controlled as described in more detail below. An example control scheme to control the lift vehicles 102-108 is a competitive cooperation scheme in which each of the lift vehicles 102-108 is controlled as though that vehicle is in control of the direction of the payload. Furthermore, the control scheme used in the example vehicles 102-108 is implemented independently by each of the lift vehicles 102-108 and does not rely on communication between the lift vehicles 102-108 or communication with an external control system. While communication between the vehicles 102-108 or communication with an external control system may be accommodated, independence of control from communication provides a robust control scheme for the vehicles 102-108 that enables safe and accurate cooperative lifting by the vehicles 102-108 even when communications are disabled (e.g., intentionally disabled to promote vehicle stealth, externally disabled by external interference, disabled due to component failure, etc.). Additionally, control of the example vehicles 102-108 is robust against the partial or complete failure of one or more of the vehicles 102-108 (provided sufficient lift capacity exists with the remaining vehicles 102-108 to successfully lift the payload 110).

While four vehicles 102-108 and one payload 110 is illustrated in FIG. 1, any number of vehicles (e.g., two or more) may be used to cooperatively lift any number of payloads (e.g., one or more).

Figure 2:
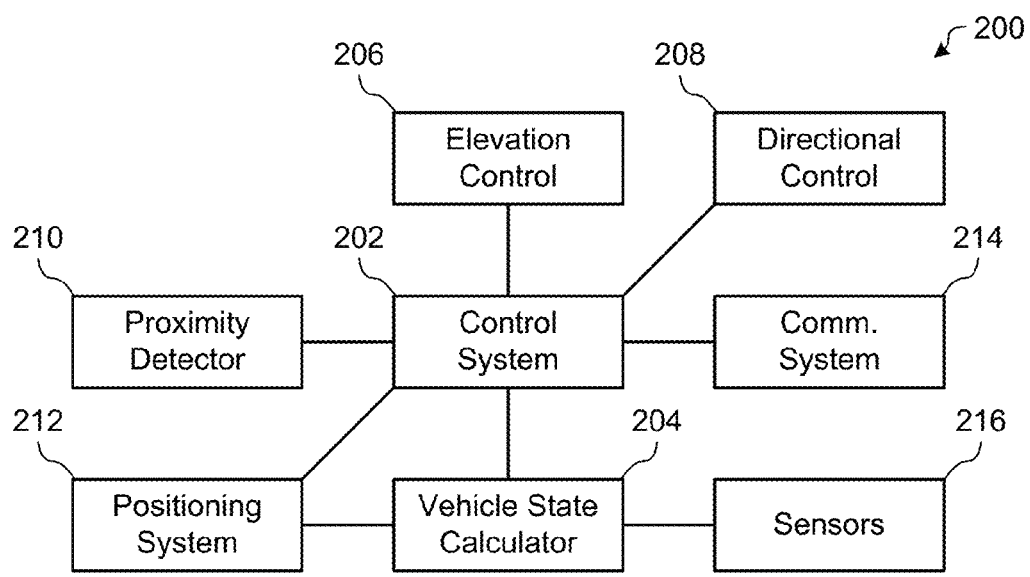
FIG. 2 is a block diagram of an example lift vehicle that may be used to implement any of the lift vehicles of FIG. 1

FIG. 2 is a block diagram of an example lift vehicle 200 that may be used to implement any of the lift vehicles 102-108 of FIG. 1. The example lift vehicle 200 of FIG. 2 includes a control system 202, a vehicle state calculator 204, elevation control device(s) 206, direction control device(s) 208, a proximity detector 210, a positioning system 212, a communication system 214, and sensors 216.

The example control system 202 of FIG. 2 receives commands and states of the lift vehicle 200 (e.g., positional states). The control system 202 calculates output commands to control the lift vehicle 200 based on the commands and/or states. For example, the vehicle state calculator 204 calculates and provides vehicle states such as a positional state with respect to a payload (e.g., the payload 110 of FIG. 1), a positional state with respect to a goal location (e.g., a payload location, a dropoff location, etc.), a positional state with respect to other lift vehicles (e.g., other ones of the lift vehicles 102-108 of FIG. 1), and/or an orientation and/or directional state of the lift vehicle 200 (e.g., a velocity vector, an angular velocity vector, an angular acceleration vector, etc.). The example orientation and/or directional state may also be expressed in terms of aerodynamic coefficients of the lift vehicle 200, such as lift, drag, pitching moment, side force, rolling moment, yawing moment, etc. The vehicle state(s) are defined and calculated differently based on the type of the lift vehicle 200. As described in more detail below, the states may be defined in terms of the relationship between the lift vehicle 200 and the payload 110 (e.g., a direction and a tension force).

The example vehicle state calculator 204 calculates the positional state(s) of the lift vehicle 200 based on vehicle sensors 216. For example, the vehicle sensors 216 include the states of actuators of the lift vehicle 200 (e.g., states of the elevation control 206 and/or the directional control 208, such as engine throttle, pitch control, torque control, and/or cyclic control, etc.) to determine the control forces being applied to the lift vehicle 200. The example vehicle sensors 216 additionally or alternatively include acceleration, inertia, and/or rotation sensors that measure the effects on and/or motion of the lift vehicle 200. For example, the forces being applied to the lift vehicle 200 may be counteracted by external forces on the lift vehicle 200 due to, for example, forces from the load 110 and/or wind forces. The example vehicle state calculator 204 derives (e.g., calculates) the positional state(s) of the lift vehicle 200 from the sensors 216 and based on knowledge of the pre-determined aerodynamic qualities of the lift vehicle 200 (e.g., force buildup equations describing the lift vehicle 200) by calculating the acceleration, velocity, moment(s), orientation(s), and/or any other quality or state of the lift vehicle 200.

The example elevation control 206 and directional control 208 of FIG. 2 cooperate to control the lift and the direction of the lift vehicle 200. For example, the elevation control 206 may include the thrust or engine speed of the lift vehicle 200 and/or the tension applied to the load 110. The example directional control 208 may control the pitch, yaw, and/or roll of the lift vehicle 200. The example control system 202 of FIG. 2 issues commands to the elevation control 206 and/or to the directional control 208 to control the lift vehicle 200. The elevation control 206 and/or to the directional control 208 may be replaced and/or supplemented with other command or control schemes, such as by controlling thrust and/or throttle, and/or control surfaces of the vehicle 200.

The example proximity detector 210 of FIG. 2 detects a proximity (or respective proximities) from the lift vehicle 200 to the other vehicles 102-108 that are cooperatively carrying the payload 110. In some examples, the proximity detector 210 determines proximities (e.g., distances) to external objects (e.g., other ones of the vehicles 102-108 participating in lifting the payload 110, vehicles not participating in lifting the payload 110, terrain, and/or other external objects). The proximity detector 210 of FIG. 2 monitors and/or detects object proximities in one or more direction(s) and/or fields of view around the lift vehicle 200. The example control system 202 obtains the proximities from the proximity detector 210 and generates vehicle control commands based in part on the proximities.

The example positioning system 212 of FIG. 2 determines a positioning of the lift vehicle 200 with respect to the ground (e.g., a global positioning system or other satellite-based positioning system, an inertial guidance system, a satellite/inertial hybrid positioning system, and/or any other type of positioning system). The example control system 202 uses the position of the lift vehicle 200 as determined by the positioning system 212 to calculate a direction to travel toward a goal location (e.g., a location to which the payload 110 is to be carried, a waypoint, etc.).

The example communication system 214 of FIG. 2 may communicate with other ones of the vehicles 102-108 and/or with an external command system. Accordingly, the communication system 214 includes appropriate hardware, software, and/or firmware to perform wireless and/or wired communications with external systems. The communication system 214 may obtain commands to be performed by the lift vehicle 200 (e.g., a goal location, waypoints, maximum or minimum height limitations, etc.) and/or communicate position information with other ones of the vehicles 102-108 and/or with the external command system. However, in some circumstances and/or some configurations of the lift vehicle 200, the communication system 214 is disabled or omitted.

Figure 3:
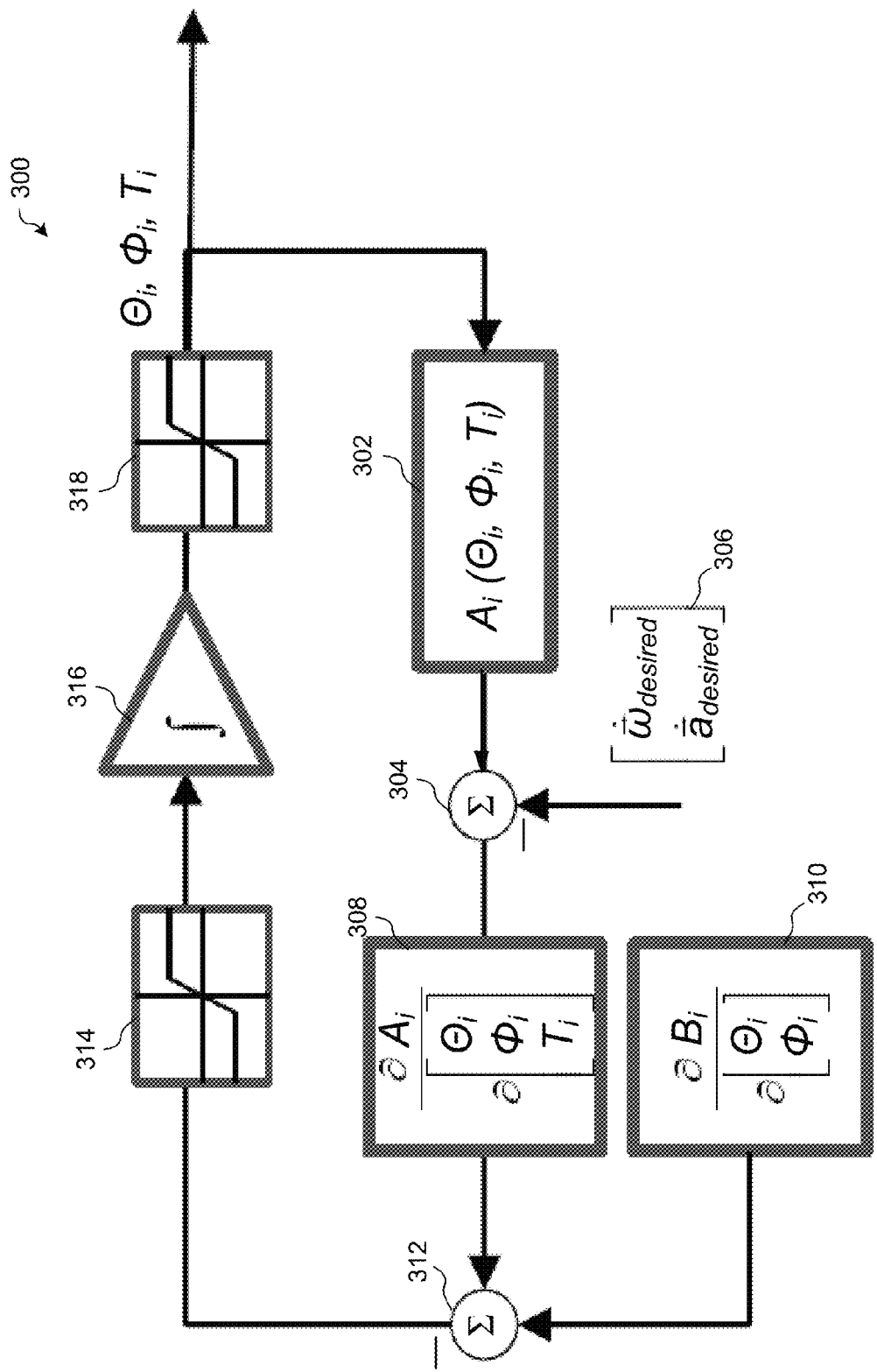
FIG. 3 is a block diagram of an example control process that may be executed by each of the example multiple lift vehicles of FIG. 1.

FIG. 3 is a block diagram of an example control process 300 that may be executed by each one of the example multiple lift vehicles 102-108 of FIG. 1. For example, the control process 300 of FIG. 3 may be implemented by the control system 202 of FIG. 2 to calculate output commands from the positional state(s) of the lift vehicle 200.

The control system 202 and/or the vehicle state calculator 204 monitor the current actuator commands $A(\theta, \phi, T)$ (e.g., commands to the elevation control 206 and/or the directional control 208, control surfaces such as a rudder, elevator or aileron, lift-generators such as a main rotor, torque generators such as a tail rotor, etc.) of the lift vehicle 200. The actuator commands $A(\theta, \phi, T)$ are a function of the elevation angle $\theta$ of the lift vehicle 200 with respect to the payload 110, the azimuth $\phi$ of the lift vehicle 200 with respect to the payload 110, and the tension force T of the lift vehicle 200 on the payload 110. Block 302 represents the commanded state of the lift vehicle 200 as represented by the actuator commands $A(\theta, \phi, T)$.

In the example of FIG. 3, the actuator commands $A(\theta, \phi, T)$ represent the current state to which each actuator (e.g., elevation control 206 and/or the directional control 208) has been commanded and may be represented by a vector. The actuator commands $A(\theta, \phi, T)$ define the position to which the lift vehicle 200 is currently being directed. Typically, the current actuator commands $A(\theta, \phi, T)$ are represented by a vector that includes a term defining the state to which the lift vehicle 200 is currently commanded. In some examples, the actuator commands $A(\theta, \phi, T)$ are represented by a system state vector and may be equated to a vehicle attitude matrix as shown below in Equation (1).

$$A(\theta, \phi, T) = \begin{bmatrix} \dot{\vec{\omega}} \\ \dot{\vec{v}} \end{bmatrix} \quad \text{Equation (1)}$$

In Equation (1), $\dot{\vec{\omega}}$ is the anticipated change in the angular vector of the lift vehicle 200, and is calculated using Equation (2).

$$\dot{\vec{\omega}} = J^{-1} \sum_i \vec{r}_i \times \vec{\tau}_i \quad \text{Equation (2)}$$

Figure 4:
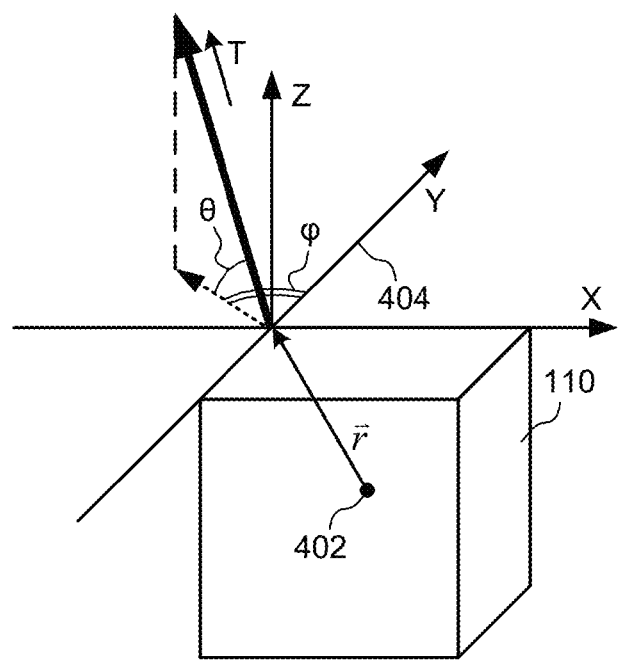
FIG. 4 illustrates a reference for example control variables with respect to a payload for the example control process of FIG. 3.

In Equation (2), $J^{-1}$ is the inertia matrix for the payload 110, r is the vector from the center of mass of the payload 110 to the point of attachment of the payload 110 to the lift vehicle 200 (or a cable or other attachment device), and $\vec{\tau}$ is the tension vector from the point of attachment of the payload 110 caused by the lift vehicle 200. FIG. 4 illustrates a reference for example control variables $\theta$, $\phi$, T, $\vec{r}$, and $\vec{\tau}$, with respect to the payload 110 for the example control process 300 of FIG. 3. The example diagram of FIG. 4 includes a Cartesian reference system. The example payload 110 has a moment of inertia 402 (which may or may not be the center of gravity of the payload 110) from which the vector $\vec{r}$ is determined. As illustrated in FIG. 4, $\theta$ is the altitude of the tension vector $\vec{\tau}$ from the payload 110 (e.g., at the attachment point) and $\phi$ is the azimuth of the tension vector $\vec{\tau}$ from a selected reference direction 404 (e.g., at the attachment point). As illustrated in Equation (3) below, the tension vector $\tau$ is a function of the tension force T, the altitude $\theta$, and the azimuth $\phi$ of the lift vehicle 200 with respect to the payload 110.

$$\vec{\tau}_i = T_i \vec{f}(\theta_i, \phi_i) \quad \text{Equation (3)}$$

Returning to FIG. 3, In Equation (1), $\dot{\vec{a}}$ is the anticipated change in the linear vector (e.g., linear acceleration) of the lift vehicle 200, and is calculated using Equation (4) below. The vector function $\vec{f}(\theta, \phi)$ may be, for example, a standard or unit vector function to represent a vector in a direction defined by $\theta$ and $\phi$. In Equation (4), m is the mass of the payload 110 and g is the acceleration due to gravity.

$$\dot{\vec{a}} = \frac{1}{m} \sum_i \vec{\tau}_i + \begin{bmatrix} 0 \\ 0 \\ mg \end{bmatrix} \quad \text{Equation (4)}$$

The tension vector $\vec{\tau}_i$ is the tension vector for the ith vehicle, where i ranges from 1 to the total number of vehicles in the competitively cooperative lift configuration.

Block 304 is a summation block that determines the difference between the current vehicle attitude matrix $$\begin{bmatrix} \dot{\vec{\omega}} \\ \dot{\vec{a}} \end{bmatrix}$$

and a desired vehicle attitude matrix 306

$$\begin{bmatrix} \dot{\vec{\omega}}_{desired} \\ \dot{\vec{a}}_{desired} \end{bmatrix}.$$

The control system 202 receives and/or determines the desired vehicle attitude matrix 306 based on, for example, calculating a direction in which the lift vehicle 200 is to move to travel to a desired goal location. Thus, the desired vehicle attitude matrix 306 is based on a received or stored command and/or the aerodynamic properties of the lift vehicle 200.

Block 308 represents anticipated changes in the actuator commands $A(\theta, \phi, T)$. The changes in the actuator commands $A(\theta, \phi, T)$ are based on the positional state of the vehicle with respect to the payload (e.g., anticipated changes in the elevation angle $\theta$ of the lift vehicle 200 with respect to the payload 110, the azimuth $\phi$ of the lift vehicle 200 with respect to the payload 110, and the tension force T of the lift vehicle 200 on the payload 110). The changes in the actuator commands A(θ, φ, T) are further based on a positional state of the lift vehicle 200 with respect to the goal location. For example, the changes in the actuator commands A(θ, φ, T) are determined based on a rotational change and a velocity change to be made to the lift vehicle 200 to move the payload 110 toward the goal location. The control system 202 may calculate changes to the actuator commands A(θ, φ, T) by, for example, determining a difference between $$\begin{bmatrix} \dot{\vec{\omega}} \\ \dot{\vec{a}} \end{bmatrix} \text{ and } \begin{bmatrix} \dot{\vec{\omega}}_{desired} \\ \dot{\vec{a}}_{desired} \end{bmatrix}$$

in block 304 and converting the differences between the vectors to actuator commands A(θ, φ, T) by applying the differences to predetermined equations containing the aerodynamic coefficients of the lift vehicle 200. In the example block 308, the control system 202 applies a weight to the actuator commands A(θ, φ, T). In some examples, the weight is a unitary weight. In other examples, the weight is based on factors such as a number of vehicles that are participating in lifting the payload 110.

The example control system 202 of FIG. 2 further determines an effect of a separation cost B(θ, φ) on the actuator commands. The example separation cost B(θ, φ) of FIGS. 1-3 is based on the total of the separation costs with respect to each of the other ones of the vehicles 102-108. Equation (5) illustrates an example calculation of the separation cost B(θ, φ).

$$B_i(\theta_i, \phi_i) \sum_j \frac{1}{\left[\|\vec{D}_{i,j}\|\right]^N} \quad \text{Equation (5)}$$

In Equation (5), $\vec{D}_{i,j}$ is the distance vector from the vehicle i performing the calculation (e.g., the vehicle 102 of FIG. 1) to a second vehicle j, and N is an exponent that may be adjusted to tune the relationship of the relative weight of the separation cost B(θ, φ) to the proximity between vehicles 102-108. The example exponent N of Equation (5) is greater than 1 to exponentially increase the value of the cost function as the distance $\vec{D}_{i,j}$ decreases. The example control system 202 and/or the example proximity detector 210 of FIG. 2 calculate the distance vectors using Equations (6) and (7).

$$\vec{D}_{i,j} = \vec{p}_i - \vec{p}_j \quad \text{Equation (6)}$$

$$\vec{p}_i = L_i \vec{f}(\theta_i, \phi_i) \quad \text{Equation (7)}$$

Figure 5:
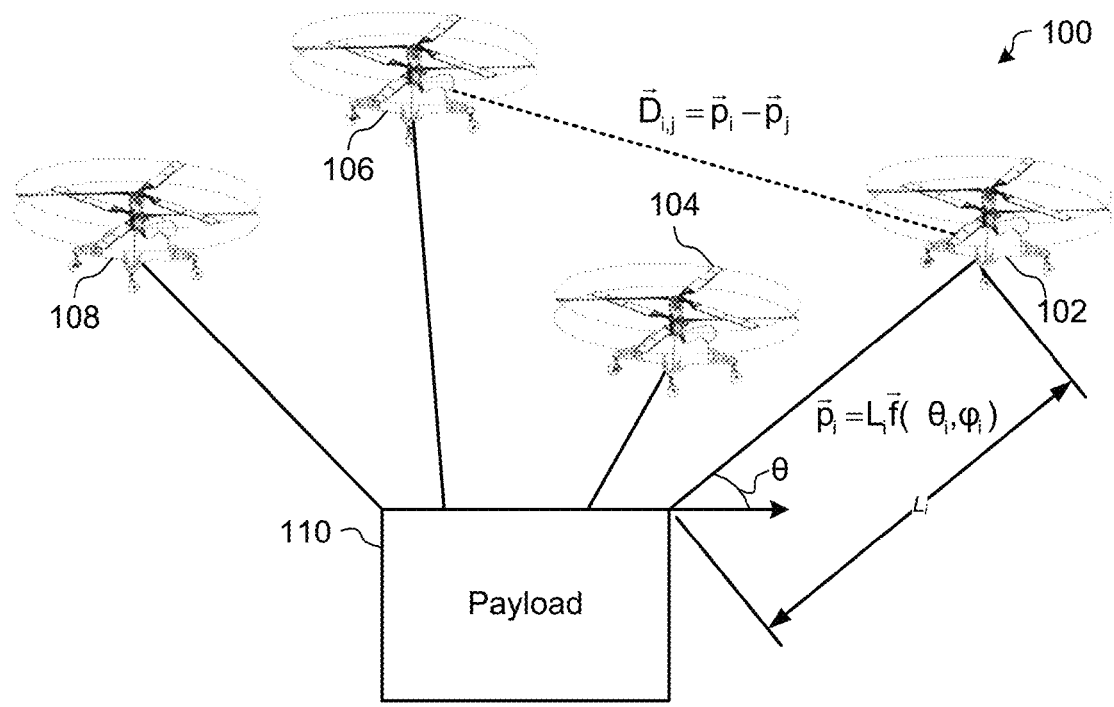
FIG. 5 illustrates a reference for example control variables with respect to other lift vehicles for the example control process of FIG. 3.

FIG. 5 illustrates a reference for example control variables $\vec{D}_{i,j}$, $\vec{p}_i$, and L, for the lift vehicle 102 with respect to another of the lift vehicles 104 for the example control process of FIG. 3. In Equation (6), $\vec{p}_i$ is the vector representing the positional state of the vehicle i (e.g., the vehicle performing the calculation) and $\vec{p}_j$ is the vector representing the positional state of the vehicle j (e.g., another vehicle). In Equation (7), L is the length of the cable, tether, or other attachment device representative of the distance between the lift vehicle 200 and the payload 110. The example control system 202 may be provided with the length L from a cable control device (e.g., a monitor on a winch, etc.) and/or via the communications device 214 for a static length L.

Returning to FIG. 3, the separation cost B(θ, φ) increases at a rate determined based on the assigned exponent N as the lift vehicle 200 approaches any of the other vehicles 102-108.

The example block 308 and block 310 of FIG. 3 output a command change function $$\frac{\partial A_i}{\partial \begin{bmatrix} \theta_i \\ \phi_i \\ T_i \end{bmatrix}}$$

and a separate cost function $$\frac{\partial B_i}{\partial \begin{bmatrix} \theta_i \\ \phi_i \end{bmatrix}},$$

which are combined by summation block 312. Because the example control process 300 of FIG. 3 is a negative feedback loop, the output of block 312 of FIG. 3 is inverted. The example block 312 combines the first and second functions to calculate a combined control function and determines a solution to the combined control function. For example, the combined control function may be an optimization function to balance a desired change in the actuator commands A(θ, φ, T) with the separation cost B(θ, φ) incurred by different commands and/or movements. In such examples, the solution optimizes the costs of the combined control function to advance the payload 110 in a desired direction while maintaining an acceptable distance from other ones of the vehicles 102-108. The acceptable distance changes based on the surroundings of the lift vehicle 200. For example, the acceptable distance may be smaller when there are external objects (e.g., other vehicles, terrain, etc.) on opposite sides of the vehicle than when there are external objects on only one side of the vehicle. When the lift vehicle 200 is surrounded by other objects, the separation cost B(θ, φ) causes the control system 202 to find a command that minimizes the costs, which could result in the lift vehicle 200 being commanded to stay as close to the center of the external objects as possible.

The resulting commands may also be limited as shown in block 314 such that each actuator remains within a predefined range (e.g., tolerance). For example, the position of a control surface or operation of an actuator may be limited so as to remain within a predefined acceptable operating range of the control surface or actuator as defined by upper and/or lower limits. An example integrator 316 of FIG. 3 converts the rates of change, as determined in block 312 and rate-limited in block 314, into actuator commands and/or control surface commands. For example, the rates of change may be integrated using a local feedback loop and a second limiter block 318. The second limiter 318 maintains each control surface and/or actuator within a predefined range. For example, the second limiter 318 may limit the position of a throttle or the position of a control surface so as to remain within a respective range of positions including upper and/or lower limits.

When the desired changes in the control surfaces and/or actuators have been appropriately limited by block 318 to prevent the lift vehicle 200 from being commanded to exceed its limitations, the changes in the elevation controls 206 and/or the directional controls 208 that have been determined to affect the desired change in the positional state rates of the lift vehicle 200 are issued as commands A(θ, φ, T) to appropriate ones of the elevation controls 206 and/or the directional controls 208 based on the type of the lift vehicle 200.

While an example control process 300 is shown and described in FIGS. 3-5, the example control process 300 may be modified to implement the functions and/or data in other manners. For example, the process 300 of FIGS. 3-5 may define the positional states of the lift vehicle 200 with respect to other derivable variables and/or using other applicable control and/or positional state calculation functions. Additionally or alternatively, in some examples, the control system 202 of FIG. 2 may output from the control process 300 an elevation angle θ of the lift vehicle 200 with respect to the payload 110, an azimuth φ of the lift vehicle 200 with respect to the payload 110, and the tension force T of the lift vehicle 200 on the payload 110, which are to be achieved by the lift vehicle 200, in which case the elevation controls 206 and/or the example directional controls 208 receive the output variables (e.g., θ, φ, and T) and convert the output variables (θ, φ, T) to respective actuator and/or control surface commands A(θ, φ, T).

Figure 6A:
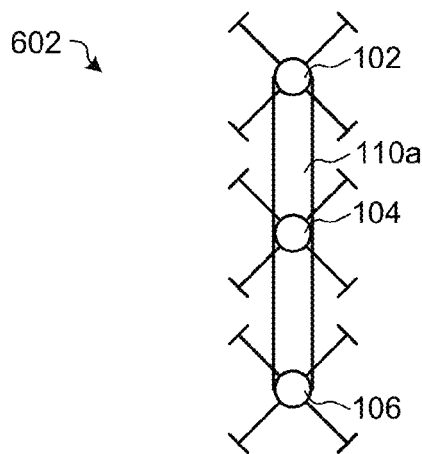
FIGS. 6A-6F illustrates top views of example lift configurations of multiple vehicles for lifting loads.
Figure 6B:
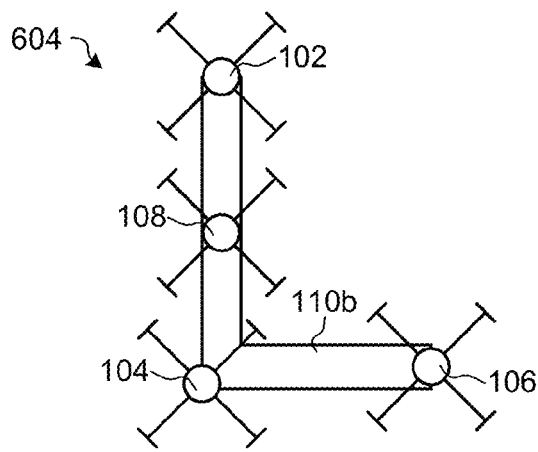
Figure 6C:
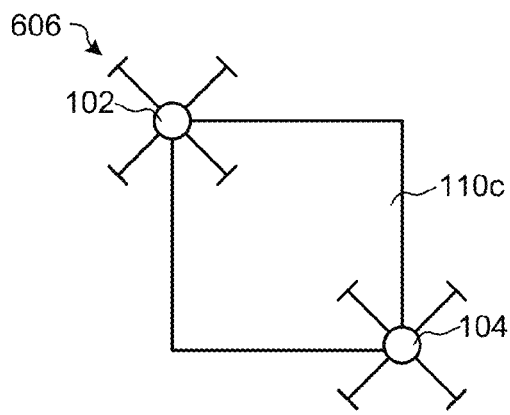
Figure 6D:
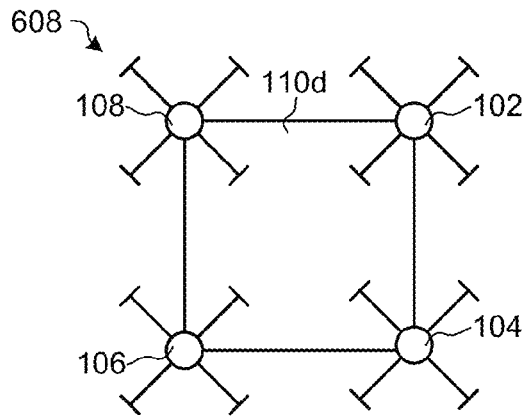
Figure 6E:
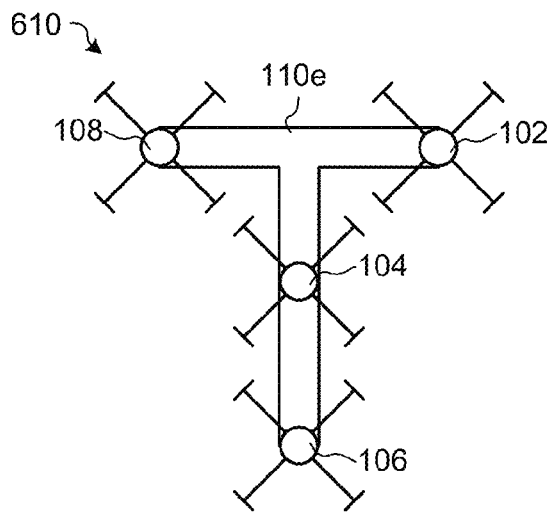
Figure 6F:
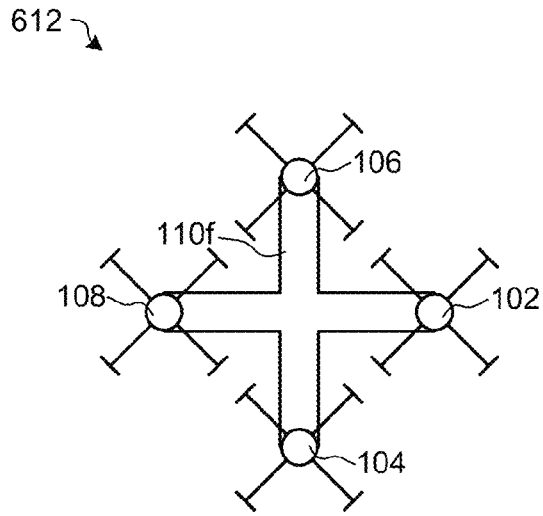
Figure 6G:
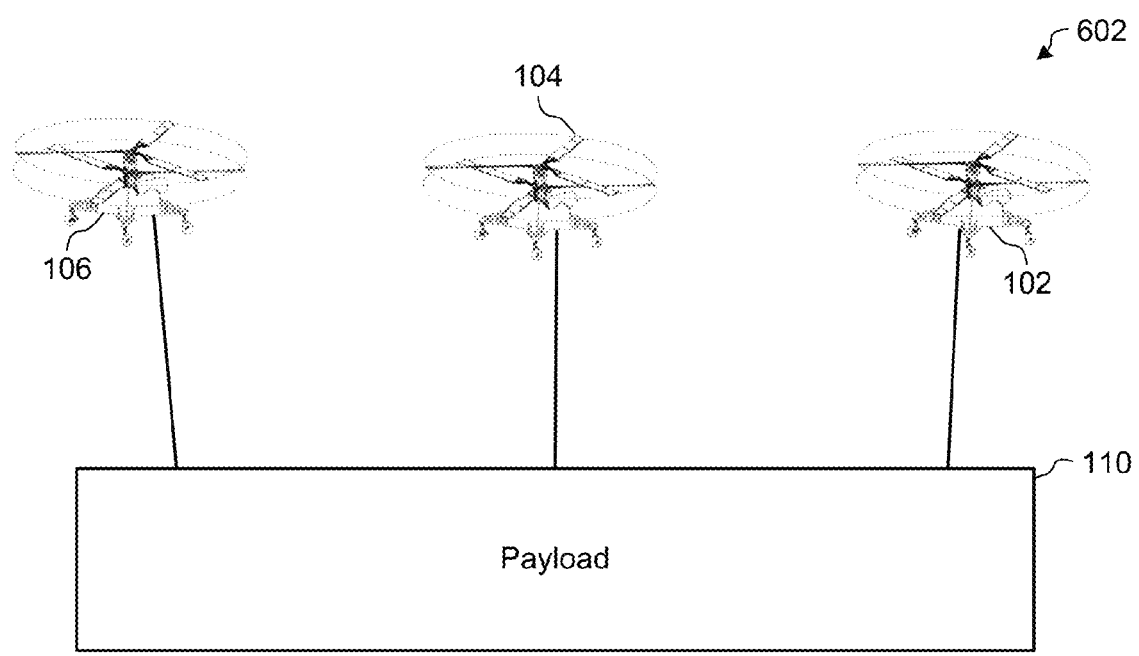
FIG. 6G illustrates a side view of the example configuration of FIG. 6A.

FIGS. 6A-6F illustrates top views of example lift configurations 602, 604, 606, 608, 610, and 612 of multiple vehicles 102, 104, 106, and/or 108 for lifting payloads 110a-110f. In each of the example configurations 602-612, the implementing vehicles 102, 104, 106, and/or 108 each perform the example control process 300 of FIG. 3 to cooperatively yet competitively control the respective payloads 110. While the example configurations 602-612 are illustrated in FIGS. 6A-6F, any other configuration of vehicles 102-108 and/or payloads 110 may be used. In the example configurations 602-612, the vehicles 102-108 are connected to the payloads 110a-110f by respective tethers or cables. FIG. 6G illustrates a side view of the example configuration 602 of FIG. 6A.

While an example manner of implementing the vehicles 102-108 of FIG. 1 is illustrated in FIG. 2, one or more of the elements, processes and/or devices illustrated in FIG. 2 may be combined, divided, re-arranged, omitted, eliminated and/or implemented in any other way. Further, the example control system 202, the example vehicle state calculator 204, the example elevation control 206, the example directional control 208, the example proximity detector 210, the example positioning system 212, the example communication system 214, the example sensors 216 and/or, more generally, the example vehicle 200 of FIG. 2 may be implemented by hardware, software, firmware and/or any combination of hardware, software and/or firmware. Thus, for example, any of the example control system 202, the example vehicle state calculator 204, the example elevation control 206, the example directional control 208, the example proximity detector 210, the example positioning system 212, the example communication system 214, the example sensors 216 and/or, more generally, the example vehicle 200 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example control system 202, the example vehicle state calculator 204, the example elevation control 206, the example directional control 208, the example proximity detector 210, the example positioning system 212, the example communication system 214, and/or the example sensors 216 is/are hereby expressly defined to include a tangible computer readable storage device or storage disk such as a memory, a digital versatile disk (DVD), a compact disk (CD), a Blu-ray disk, etc. storing the software and/or firmware. Further still, the example vehicles 102-108 of FIG. 1 may include one or more elements, processes and/or devices in addition to, or instead of, those illustrated in FIG. 2, and/or may include more than one of any or all of the illustrated elements, processes and devices.

Figure 7:
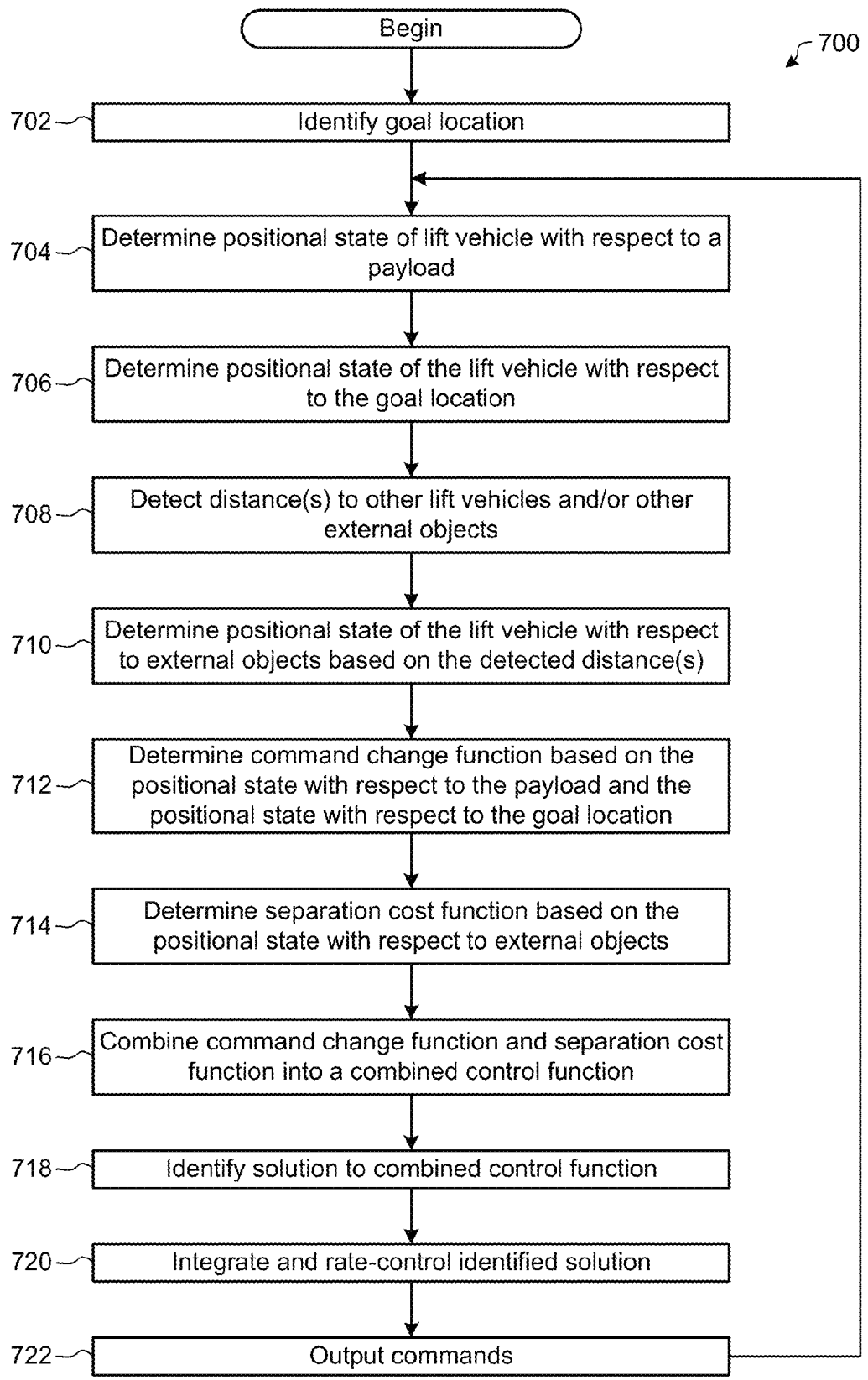
FIG. 7 is a flowchart representative of an example process to control a lift vehicle to lift a payload in competitive cooperation with other lift vehicles

A flowchart representative of an example method for implementing the vehicles 102, 104, 106, 108, and/or 200 of FIGS. 1 and/or 2 is shown in FIG. 7. In this example, the method may be implemented by machine readable instructions that comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 7, many other methods of implementing the example vehicles 102, 104, 106, 108, and/or 200 alternatively be used. For example, the order of execution of the blocks may be changed, and/or some of the blocks described may be changed, eliminated, or combined.

As mentioned above, the example method of FIG. 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example method of FIG. 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 7 is a flowchart representative of an example method 700 to control a lift vehicle (e.g., the lift vehicles 102-108 and/or 200 of FIGS. 1 and/or 2) to lift a payload (e.g., the payload 110 of FIG. 1) in competitive cooperation with other lift vehicles. The example method 700 may be performed by the example vehicle 200 of FIG. 2 to implement any of the example vehicles 102-108 of FIG. 1.

The example vehicle 200 (e.g., via the control system 202 and/or the communication device 214) identifies a goal location (block 702). The goal location may be, for example, a waypoint or a location to which the payload 110 is to be moved. In some examples, the control system 202 receives one or more goal locations (e.g., an ordered list of commands and/or goals) via the communication device 214.

The vehicle state calculator 204 determines a first positional state of the lift vehicle 200 with respect to the payload 110 (block 704). For example, the vehicle state calculator 204 may compare a current state of the elevation controls 206 and/or the directional controls 208 (e.g., an elevation and/or a direction to which the lift vehicle 200 is being controlled to assume) to an actual physical state of the lift vehicle 200 (e.g., velocity vector, an angular velocity vector, an angular acceleration vector, an angle of attack), from which the elevation angle θ of the lift vehicle 200 with respect to the payload 110, the azimuth φ of the lift vehicle 200 with respect to the payload 110, and the tension force T of the lift vehicle 200 on the payload 110 may be derived.

The vehicle state calculator 204 and/or the positioning system 212 determines a second positional state of the lift vehicle 200 with respect to the goal location (block 706). For example, vehicle state calculator 204 and/or the positioning system 212 may compare a current location (e.g., latitude, longitude, and altitude, etc.) of the lift vehicle 200 with the goal location (e.g., latitude, longitude, and altitude, etc.) to calculate a bearing to the goal location.

The proximity detector 210 detects distance(s) to the other lift vehicles and/or to other objects external to the lift vehicle 200 (e.g., terrain features) (block 708). The proximity detector 210, the vehicle state calculator 204, and/or the control system 202 determines a third positional state of the lift vehicle 200 with respect to the external objects based on the detected distance(s) (block 710). For example, the proximity detector 210, the vehicle state calculator 204, and/or the control system 202 may generate separate cost functions (e.g., separation cost(s) B(θ, φ) of FIG. 3) for each detected object and its associated distance from the lift vehicle 200. In some examples, the proximity detector 210, the vehicle state calculator 204, and/or the control system 202 combines the cost functions B(θ, φ) into a single combined cost function for the detected external objects.

The control system 202 determines a command change function based on the first positional state (e.g., with respect to the payload 110) and based on the second positional state (e.g., with respect to the goal location) (block 712). For example, the control system 202 may calculate the command change function $$\frac{\partial A_i}{\partial \begin{bmatrix} \theta_i \\ \phi_i \\ T_i \end{bmatrix}}$$

of block 308 of FIG. 3. The example command change function $$\frac{\partial A_i}{\partial \begin{bmatrix} \theta_i \\ \phi_i \\ T_i \end{bmatrix}}$$

indicates desired changes in the actuator commands A(θ, φ, T) based on changes in the control variables θ, φ, and T, to advance the lift vehicle 200 and/or the payload 110 toward the goal location given the current state of the lift vehicle 200 with respect to the payload 110.

The control system 202 further determines a separation cost function $$\frac{\partial B_i}{\partial \begin{bmatrix} \theta_i \\ \phi_i \end{bmatrix}}$$

based on the third positional state (e.g., with respect to the external objects) (block 714). The example separation cost function $$\frac{\partial B_i}{\partial \begin{bmatrix} \theta_i \\ \phi_i \end{bmatrix}}$$

indicates a cost associated with changes in the control variables θ, φ, and T that are also used in the command change function $$\frac{\partial A_i}{\partial \begin{bmatrix} \theta_i \\ \phi_i \\ T_i \end{bmatrix}}.$$

The control system 202 combines the command change function $$\frac{\partial A_i}{\partial \begin{bmatrix} \theta_i \\ \phi_i \\ T_i \end{bmatrix}}$$

and the separation cost function $$\frac{\partial B_i}{\partial \begin{bmatrix} \theta_i \\ \phi_i \end{bmatrix}}$$

into a combined control function $$\left( e.g., \frac{\partial A_i}{\partial \begin{bmatrix} \theta_i \\ \phi_i \\ T_i \end{bmatrix}} - \frac{\partial B_i}{\partial \begin{bmatrix} \theta_i \\ \phi_i \end{bmatrix}} \right)$$

(block 716). The example combination may be performed by block 314 of FIG. 3. The combined control function balances the desired changes in actuator commands A(θ, φ, T) with the separation costs B(θ, φ) associated with moving the lift vehicle 200 in certain directions.

The control system 202 identifies a solution to the combined control function (block 718). For example, the control system 202 may identify a combination of changes to the control variables θ, φ, and T that optimizes the movement of the lift vehicle 200 (e.g., minimizes costs and/or maximizes desired movement achieved from the commands). The example block 314 of FIG. 3 solves the combined control function and outputs the resulting changes to the control variables θ, φ, and T.

The control system 202 integrates and rate-controls the identified solution (block 720). For example, block 314 may apply a saturation or rate-control function to the changes in the control variables θ, φ, and T and/or to commands issued to the elevation control 206 and/or the directional control 208 to implement the changes to the control variables θ, φ, and T. The example integration block 316 converts the (rate-controlled) changes in the control variables θ, φ, and T to resulting control variables θ, φ, and T that the lift vehicle 200 is to be controlled to achieve. Block 318 applies a saturation or rate-control function to the resulting control variables θ, φ, and T.

The control system 202 outputs commands representative of the integrated and rate-controlled solution to the elevation control 206 and/or the directional control 208 to control the lift vehicle 200 (block 722). For example, the elevation control 206 and/or the directional control 208 may convert the control variables θ, φ, and T and/or associated commands to changes to actuators, control surfaces, and/or any other type of aerodynamic control device on the lift vehicle 200. The example process 700 then returns to block 704 to continue controlling the lift vehicle 200.

Figure 8:
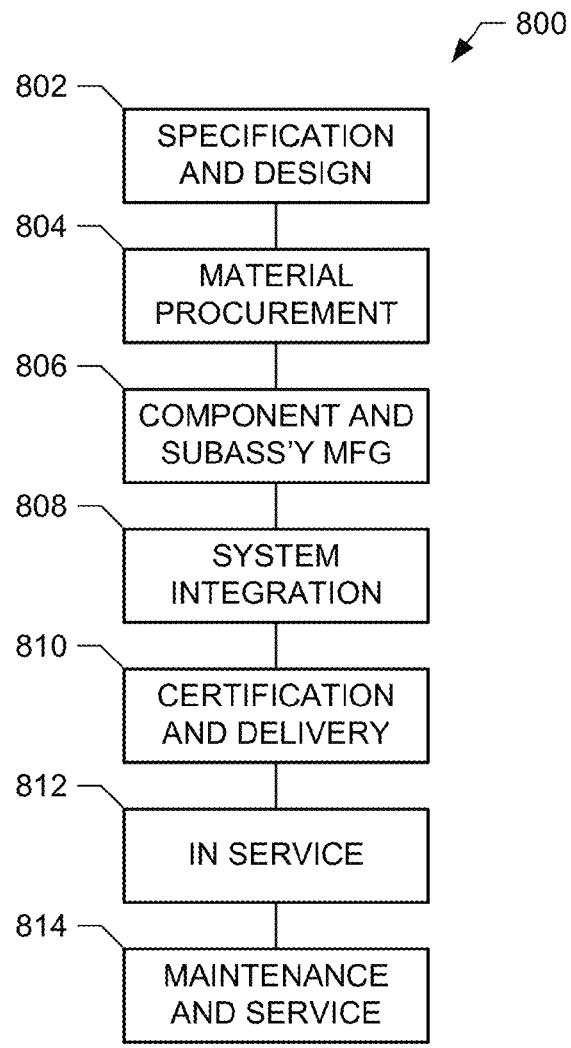
FIG. 8 is a flowchart of platform production and service methodology.
Figure 9:
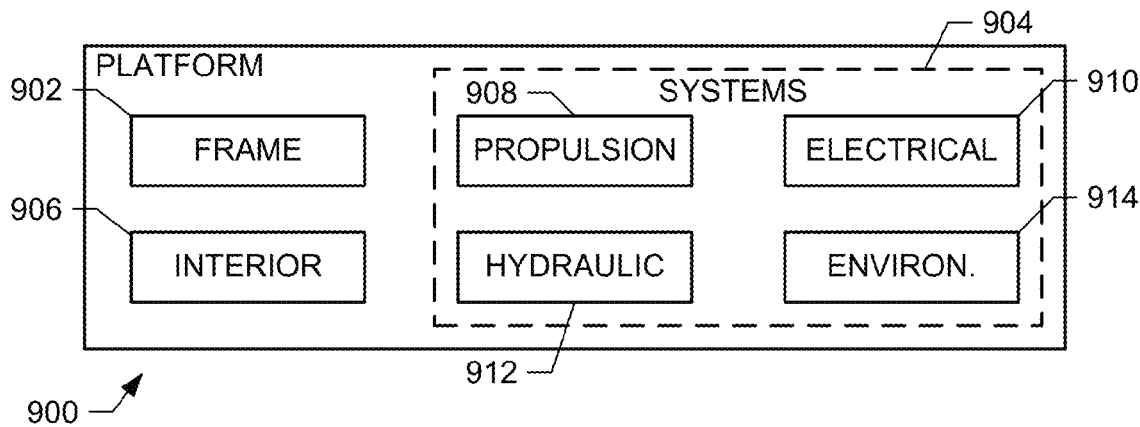
FIG. 9 is a block diagram of a platform.

Examples of the disclosure may be described in the context of a platform manufacturing and service method 800 as shown in FIG. 8 and a platform 900, such as an aircraft, as shown in FIG. 9. During pre-production, the example method 800 may include specification and design (block 802) of the platform 900 (e.g., a lift vehicle). The example control process 300 and/or the example process 700 may be developed during the specification and design portion of preproduction of block 802. Preproduction may further include material procurement (block 804). During production, component and subassembly manufacturing (block 806) and system integration (block 808) of the platform 900 (e.g., a lift vehicle) takes place. The example vehicles 102-108 and/or 200 of FIGS. 1 and/or 2 may be constructed during production, component and subassembly manufacturing of block 806, and/or programmed with the process 300 of FIG. 3 and/or the process 700 of FIG. 7 during production, component and subassembly manufacturing of block 806 and/or system integration of block 808. In particular, the control system 202, the vehicle state calculator 204, the elevation control 206, the directional control 208, the proximity detector 210, the sensors 216, the control process 300 and/or the process 700 of FIGS. 2, 3, and/or 7 may be configured or programmed with the specific equations and/or aerodynamic coefficients specific to the particular vehicle being constructed. Thereafter, the platform 900 (e.g., a lift vehicle) may go through certification and delivery (block 810) in order to be placed in service (block 812). While in service by a customer, the platform 900 (e.g., a lift vehicle) is scheduled for routine maintenance and service (block 814), which may also include modification, reconfiguration, refurbishment, etc., of the control system 202, the vehicle state calculator 204, the elevation control 206, the directional control 208, the proximity detector 210, the sensors 216, the control process 300 and/or the process 700 during the maintenance and service procedures of block 814.

Each of the operations of the example method 800 may be performed or carried out by a system integrator, a third party, and/or an operator (e.g., a customer). For the purposes of this description, a system integrator may include without limitation any number of platform (e.g., a lift vehicle) manufacturers and major-system subcontractors; a third party may include without limitation any number of venders, subcontractors, and suppliers; and an operator may be an airline, leasing company, military entity, service organization, and so on.

As shown in FIG. 9, the platform 900 (e.g., a lift vehicle) produced by example method 800 may include a frame 902 with a plurality of systems 904 and an interior 906. Examples of high-level systems 904 include one or more of a propulsion system 908, an electrical system 910, a hydraulic system 912, and an environmental system 914. The example systems and methods disclosed herein may be integrated into the example systems 904, 908, 910, 912, 914. Any number of other systems may be included.

Apparatus and methods embodied herein may be employed during any one or more of the stages of the production and service method 800. For example, components or subassemblies corresponding to production process 806 may be fabricated or manufactured in a manner similar to components or subassemblies produced while the platform 900 (e.g., a lift vehicle) is in service 812. Also, one or more apparatus embodiments, method embodiments, or a combination thereof may be implemented during the production stages 806 and 808, for example, by substantially expediting assembly of or reducing the cost of a platform 900 (e.g., a lift vehicle). Similarly, one or more of apparatus embodiments, method embodiments, or a combination thereof may be utilized while the platform 900 (e.g., a lift vehicle) is in service 812, for example and without limitation, to maintenance and service 814.

Figure 10:
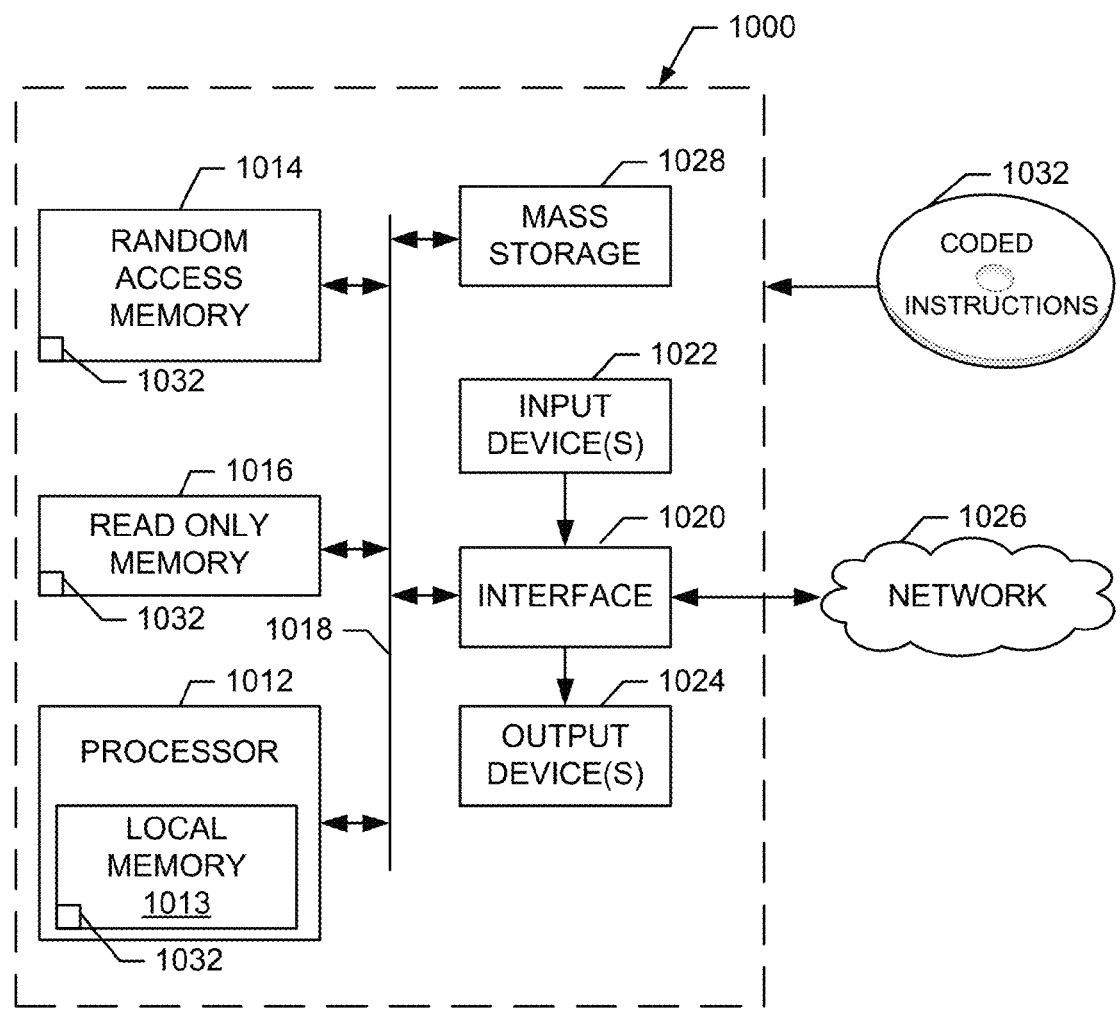
FIG. 10 is a block diagram of an example processor platform that may be used to implement the methods and apparatus described herein.

FIG. 10 is a block diagram of an example processor platform 1000 to implement the process 700 of FIG. 7 and/or to implement the lift vehicle 200 and/or the control process 300. The processor platform 1000 can be, for example, an onboard and/or integrated flight computer, a server, a personal computer, a laptop or notebook computer, or any other type of computing device or combination of computing devices.

The processor platform 1000 of the instant example includes a processor 1012. For example, the processor 1012 can be implemented by one or more microprocessors or controllers from any desired family or manufacturer.

The processor 1012 includes a local memory 1013 (e.g., a cache) and is in communication with a main memory including a volatile memory 1014 and a non-volatile memory 1016 via a bus 1014. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 also includes an interface circuit 1016. The interface circuit 1016 may be implemented by any type of interface standard, such as an Ethernet interface, a universal serial bus (USB), and/or a PCI express interface.

One or more input devices 1018 are connected to the interface circuit 1016. The input device(s) 1018 permit a user to enter data and commands into the processor 1012. The input device(s) can be implemented by, for example, a keyboard, a mouse, a touchscreen, a voice recognition system, and/or any other method of input or input device.

One or more output devices 1024 are also connected to the interface circuit 1016. The output devices 1024 can be implemented, for example, by display devices (e.g., a liquid crystal display, a cathode ray tube display (CRT), a printer and/or speakers). The interface circuit 1016, thus, typically includes a graphics driver card.

The interface circuit 1016 also includes a communication device such as a modem or network interface card to facilitate exchange of data with external computers via a network 1026 (e.g., an Ethernet connection, a wireless local area network (WLAN) connection, coaxial cable, a cellular telephone system, etc.).

The processor platform 1000 also includes one or more mass storage devices 1028 for storing software and data. Examples of such mass storage devices 1028 include floppy disk drives, hard drive disks, compact disk drives and digital versatile disk (DVD) drives.

Coded instructions 1032 to implement the process 700 of FIG. 7 may be stored in the mass storage device 1028, in the volatile memory 1014, in the non-volatile memory 1016, and/or on a removable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to control a lift vehicle, comprising:
   determining, using a processor of the lift vehicle, a first positional state of the lift vehicle with respect to a payload controlled by a plurality of lift vehicles including the lift vehicle;
   determining, using the processor, a second positional state of the lift vehicle with respect to a goal location;
   detecting, using a sensor of the lift vehicle, distances to other ones of the plurality of lift vehicles;
   determining, using the processor, a third positional state of the lift vehicle based on the distances to the other ones of the plurality of lift vehicles, wherein determining the first positional state, determining the second positional state, and determining the third positional state are independent of any communications with other ones of the plurality of lift vehicles or with any control systems external to the lift vehicle; and
   calculating a control command to control the lift vehicle based on the first positional state, the second positional state, and the third positional state.

2. The method as defined in claim 1, wherein determining the first positional state comprises calculating a tension force and a direction of the tension force on the lift vehicle.

3. The method as defined in claim 1, wherein determining the second positional state comprises:
   determining the goal location of the payload;
   identifying a current position of the lift vehicle based on a positioning system; and
   calculating a direction from the current position to the goal location.

4. The method as defined in claim 1, wherein determining the third positional state comprises applying a weight to at least one of the distances, the weight to increase exponentially as the at least one distance decreases.

5. The method as defined in claim 1, wherein calculating the control command comprises:
   determining a first function representative of a desired change in movement of the lift vehicle, the first function being based on the first and second positional states;
   determining a second function representative of a separation cost between the lift vehicle and at least one of the other ones of the lift vehicles, the second function being based on the third positional state;
   combining the first and second functions to calculate a combined control function; and
   determining a solution to the combined control function.

6. The method as defined in claim 5, wherein the first function comprises a change in the first and second positional states as a function of a change in a first control variable, and the second function comprises a change in the third positional state as a function of a change in the first control variable or a second control variable.

7. The method as defined in claim 1, wherein calculating the control command comprises:
   determining a first function representative of a desired change in movement of the payload, the first function being based on the first and second positional states;
   determining a second function representative of a separation cost between the lift vehicle and at least one of the other ones of the lift vehicles, the second function being based on the third positional state;
   combining the first and second functions to calculate a combined control function; and
   determining a solution to the combined control function.

8. A lift vehicle, comprising:
   an elevation control to control an elevation of the lift vehicle;
   a directional control to control a direction of movement of the lift vehicle;
   a vehicle state calculator to:
      determine a first positional state of the lift vehicle with respect to a payload controlled by a plurality of lift vehicles including the lift vehicle;
      determine a second positional state of the lift vehicle with respect to a goal location; and
      determine a third positional state of the lift vehicle based on distances to other ones of the plurality of lift vehicles;
   a control system to calculate a control command to control at least one of the elevation control or the directional control based on the first positional state, the second positional state, and the third positional state; and
   a communication system to receive a command from an external command system, the control system to calculate the control command independently of communications received via the communication system.

9. The lift vehicle as defined in claim 8, wherein the control system is to implement a control process comprising:
   determining a first function representative of a desired change in movement of the lift vehicle, the first function being based on the first and second positional states;
   determining a second function representative of a separation cost between the lift vehicle and at least one of the other ones of the lift vehicles, the second function being based on the third positional state;
   combining the first and second functions to calculate a combined control function; and
   determining a solution to the combined control function.

10. The lift vehicle as defined in claim 9, wherein the first and second functions are determined based on at least one of an altitude angle of the lift vehicle with respect to the payload, an azimuth of the lift vehicle with respect to the payload, or a tension force between the lift vehicle and the payload.

11. The lift vehicle as defined in claim 9, wherein a value of the second function is to increase exponentially as a distance between the lift vehicle and another one of the plurality of lift vehicles decreases.

12. The lift vehicle as defined in claim 8, further comprising a proximity detector to detect the distances to the other ones of the vehicles.

13. The lift vehicle as defined in claim 8, further comprising a positioning system to determine a direction from the lift vehicle to the goal location.

14. The lift vehicle as defined in claim 8, wherein the control system is to implement a control process comprising:
determining a first function representative of a desired change in movement of the payload, the first function being based on the first and second positional states;
determining a second function representative of a separation cost between the lift vehicle and at least one of the other ones of the lift vehicles, the second function being based on the third positional state;
combining the first and second functions to calculate a combined control function; and determining a solution to the combined control function.

15. A tangible machine readable storage medium comprising machine readable instructions which, when executed, cause a logic circuit of a lift vehicle to at least:
determine a first positional state of the lift vehicle with respect to a payload controlled by a plurality of lift vehicles including the lift vehicle;
determine a second positional state of the lift vehicle with respect to a goal location;
detect distances to other ones of the plurality of lift vehicles;
determine a third positional state of the lift vehicle based on the distances to the other ones of the plurality of lift vehicles; and
calculate a control command to control the lift vehicle based on the first positional state, the second positional state, and the third positional state, the instructions to cause the logic circuit to determine the first positional state, determine the second positional state, and determine the third positional state independently of any communications between the lift vehicle and other ones of the plurality of lift vehicles or a control system external to the lift vehicle.

16. The storage medium as defined in claim 15, wherein the instructions are to cause to logic circuit to determine the second positional state by:
determining the goal location of the payload;
identifying a current position of the lift vehicle based on a positioning system; and
calculating a direction from the current position to the goal location.

17. The storage medium as defined in claim 15, wherein the instructions are to cause the logic circuit to determine the third positional state by applying a weight to at least one of the distances, the weight to increase exponentially as the at least one distance decreases.

18. The storage medium as defined in claim 15, wherein the instructions are to cause the logic circuit to calculate the control command by:
determining a first function representative of a desired change in movement of the lift vehicle, the first function being based on the first and second positional states;
determining a second function representative of a separation cost between the lift vehicle and at least one of the other ones of the lift vehicles, the second function being based on the third positional state;
combining the first and second functions to calculate a combined control function; and
determining a solution to the combined control function.

19. The storage medium as defined in claim 18, wherein the first function comprises a change in the first and second positional states as a function of a change in a first control variable, and the second function comprises a change in the third positional state as a function of a change in the first control variable or a second control variable.

20. The storage medium as defined in claim 15, wherein the instructions are to cause the logic circuit to calculate the control command by:
determining a first function representative of a desired change in movement of the payload, the first function being based on the first and second positional states;
determining a second function representative of a separation cost between the lift vehicle and at least one of the other ones of the lift vehicles, the second function being based on the third positional state;
combining the first and second functions to calculate a combined control function; and determining a solution to the combined control function.

* * * * *